United States Patent

[11] 3,586,755

[72] Inventor Steven Wlasuk
Blackwood, N.J.
[21] Appl. No. 701,729
[22] Filed Jan. 30, 1968
[45] Patented June 22, 1971
[73] Assignee RCA Corporation

[54] TEST SIGNAL GENERATOR
12 Claims, 1 Drawing Fig.

[52] U.S. Cl. .......... 178/5.4 TE, 178/6, 328/39
[51] Int. Cl. .......... H04n 5/06
[50] Field of Search .......... 178/5.4, 5.4 TE, 69.5 G; 307/225; 328/39, 187, 188, 189, 6; 331/51, 52

[56] References Cited

UNITED STATES PATENTS

| | | | |
|---|---|---|---|
| 2,733,433 | 1/1956 | Morrison | 178/6 (TT) |
| 2,824,225 | 2/1958 | Luther | 178/6 (TT) |
| 2,975,229 | 3/1961 | Wlasuk | 178/5.4 (TE) |
| 3,417,316 | 12/1968 | McCaul et al. | 328/39 |
| 3,430,067 | 2/1969 | Baum | 328/39 |

*Primary Examiner*—Robert L. Griffin
*Assistant Examiner*—Richard P. Lange
*Attorney*—Eugene M. Whitacre

ABSTRACT: Test signal generating apparatus for providing color bars, dots, lines and crosshatch patterns for television receiver servicing. Color bars are produced by means of an internally generated color subcarrier offset from the standard broadcast color subcarrier by the line scanning frequency employed in the generator. Dots, vertical lines, horizontal lines and a crosshatch pattern are provided by means of pulse trains having pulse repetition rates integrally related to each other and to the line and field rates employed in the generator.

PATENTED JUN 22 1971 3,586,755
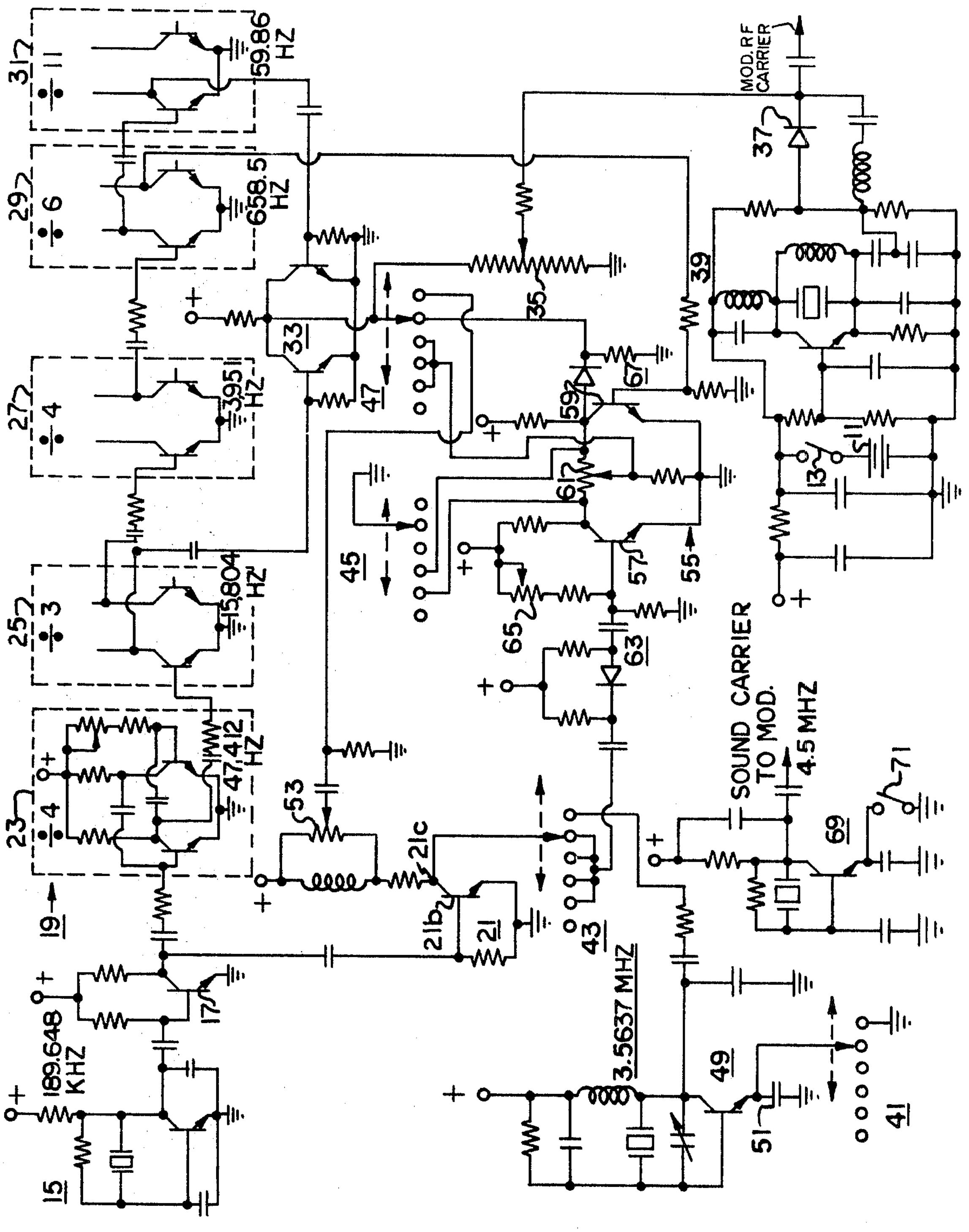
INVENTOR
STEVEN WLASUK
BY Kenneth R. Schaefer
Attorney

TEST SIGNAL GENERATOR

This invention relates to test apparatus for television equipment and, in particular, to a color bar/dot/crosshatch generator.

Servicing of television receivers and particularly color television receivers often requires the use of special signal generating apparatus for producing video test patterns such as a plurality of color bars each of different hue, a crosshatch pattern of white vertical and horizontal lines, or an array of white dots or small rectangles disposed in a regular pattern on the image reproducing device of the television receiver. These patterns are useful for checking and correctly adjusting linearity and pincushion distortions in scanning circuits and for checking and correctly adjusting operation of electron beam convergence, and color phasing and matrixing circuits in color television receivers.

It is desirable that this test apparatus be lightweight, portable, reliable and capable of producing stable video patterns without the need for expensive and complex circuitry.

In my U.S. Pat. No. 2,975,229 entitled "Television Test Apparatus," granted Mar. 14, 1961, and assigned to the same assignee as the present invention, a particularly advantageous system for generating color bars is described.

In accordance with the present invention, a generator employing color bar generating principles described in the above-referenced patent is provided with additional circuit means for producing dot and line patterns. In particular, a relatively simple, stable bar, dot, crosshatch generator is provided wherein a plurality of pulse trains are generated to produce signals for the several required video patterns and for synchronizing the horizontal and vertical deflection circuits of the receiver under test. A feature of the invention is that the pulse repetition rates (frequencies) of all such pulse trains are integrally related thereby permitting use of a single, relatively simple, serially connected pulse dividing chain. Line and field deflection synchronizing rates are selected which deviate from broadcast standards by a relatively slight amount but sufficiently to result in an integral relationship between such rates. Noninterlaced line scanning is employed.

The novel features that are considered characteristic of this invention are set forth with particularity in the appended claims. The invention itself, however, both as to its organization and method of operation as well as additional objects thereof, will best be understood from the following description when read in connection with the accompanying drawing.

Referring to the drawing, the illustrated test signal generating apparatus utilizes solid-state devices. All amplifiers and oscillators in the apparatus utilize NPN transistors which are supplied with operating voltages by means of a battery supply 11 (e.g. +4.2 volts). An ON-OFF switch 13 is provided to preserve the battery 11 when not in use.

A first crystal controlled oscillator 15 is arranged to generate a first periodic wave at a first frequency which is an integral multiple of the line scanning frequency associated with the illustrated test apparatus. Specifically, oscillator 15 produces a periodic wave at a frequency of 189.648 kHz., the twelfth harmonic of the selected line scanning frequency of 15,804 Hz.

The output wave produced by oscillator 15 is supplied to a shaping amplifier 17, the output of which is a substantially square wave having a fundamental frequency equal to the operating frequency of oscillator 15. The square wave output of amplifier 17 is supplied both to a serially connected pulse divider chain indicated generally by the reference numeral 19 and to a bar shaping and carrier keying stage 21. Stage 21 will be explained more fully below.

The pulse divider chain 19 comprises a plurality of serially coupled pulse counters 23, 25, 27, 29, 31 of conventional multivibrator construction. Details of counter 23 are shown to illustrate a typical arrangement. The time constants associated with the counters 23—31 are selected such that each counter produces at its output a pulse train having a pulse repetition rate which is an integral submultiple of the pulse repetition rate of the applied input pulse train. Thus, for example, counter 23 divides the input wave of 189.648 kHz. by a factor of four and produces an output pulse train having a pulse repetition rate of 47,412 Hz. Counter 25 is arranged to divide by a factor of three and produces an output having a pulse repetition rate of 15,804 Hz. which is ultimately utilized, after shaping in a combining amplifier 33, to provide a line scanning synchronizing signal for a receiver under test. Counters 27 and 29 divide by factors of four and six, respectively, so that counter 29 produces an output pulse train having a pulse repetition rate of 658.5 Hz. The 658.5 Hz. pulse train ultimately is utilized as a video signal component to produce horizontal lines and horizontal components of either a crosshatch or a dot pattern on the display device of a television receiver under test. The final counter 31 is arranged to divide by a factor of eleven to produce an output pulse train at a repetition rate of 59.86 Hz. The 59.86 Hz. pulse train ultimately is utilized, after shaping in combining amplifier 33, as the field synchronizing signal for a receiver under test.

It should be noted that the selected line and field synchronizing signals differ from broadcast standards by a slight amount. However, it has been found that these small deviations (e.g. 15,804 Hz. compared to 15,734 Hz. and 59.86 Hz. compared to 59.94 Hz.) (for color) are well within the operating range of commercial receivers and furthermore, do not adversely affect the receiver test and setup procedure. In fact, adjustment of the receiver controls normally is not required to accommodate the nonstandard synchronizing frequencies.

The line and field synchronizing pulses, after shaping and combining in amplifier 33, are applied to a variable resistance modulation control 35, the wiper arm of which is coupled to one electrode (the cathode) of a modulator diode 37. A second crystal controlled oscillator 39 is coupled to the anode electrode of diode 37 and is arranged to produce a radio frequency (RF) carrier wave corresponding to the carrier wave of a standard television broadcast channel (e.g. Channel 3—61.25 MHz). The radio frequency carrier wave produced by oscillator 39 is continuously modulated at diode 37 by the line and field synchronizing pulses under all operating conditions of the test generator.

The remainder of the test apparatus is arranged to provide the necessary video signal components for producing selectively a blank raster, horizontal lines, vertical lines, crosshatch, dot or color bar patterns on a receiver under test. A plurality of six-position switches 41, 43, 45 and 47 which typically may be rotary wafer switches ganged together on a single shaft are provided for selecting the desired video pattern. The switch positions or contacts will be designated as 1 through 6 from left to right as shown in the drawing and correspond, respectively to "RASTER," "HORIZONTAL LINES," "VERTICAL LINES," "CROSSHATCH," "DOT," and "COLOR BARS."

When the switches 41—47 are in the "RASTER" position, the RF carrier wave output of diode 37 is modulated only with line and field synchronizing pulses. A blank raster would be produced on a receiver under test.

In accordance with the principles set forth in my above-mentioned U.S. Pat. No. 2,975,229, when the switches 41, 43, 45, and 47 are in the sixth or "COLOR BAR" position, a third crystal controlled oscillator 49, arranged to produce an offset color subcarrier wave, is activated and is coupled to bar shaping and carrier keying stage 21. In all other positions of the switches 41—47, oscillator 49 is disabled (i.e. in the "COLOR BAR" position switch 41 is arranged to remove an RF bypass capacitor 51 from oscillator 49). Oscillator 49 provides a color subcarrier wave at a frequency which is offset from the standard broadcast color subcarrier frequency by the line synchronizing frequency employed in the generator (i.e. 3.579545 MHz − 15,804 Hz. = 3.5637+ MHz). The offset color subcarrier is supplied via the "COLOR BAR" contact of switch 43 to a second input terminal 21$c$ of keying stage 21

(the square wave output of amplifier 17 at the 12th harmonic of the line scanning frequency is coupled to the first input terminal 21*b* of stage 21). The resultant 12 bursts of offset color subcarrier per horizontal scanning line produced at the output of stage 21 are supplied via switch 47 and modulation control 35 to the modulator diode 37 to modulate the RF carrier wave supplied by oscillator 39. As described in my above-referenced patent, 10 of the offset color subcarrier bursts serve to produce in the receiver under test a video display of 10 color bars of progressively different hue. The 11th burst occurs during the line blanking period and has no effect on receiver operation. The 12th burst occurs at a time corresponding to the occurrence of the color subcarrier synchronizing burst of a standard broadcast signal and is used to synchronize the color subcarrier oscillator in the receiver under test.

A variable resistance 53 is provided in the output circuit of stage 21 and serves as a "CHROMA" control to vary the intensity (saturation) of the color bars produced at the receiver under test.

It should be noted that the function of switch 41 may be obtained by completely eliminating switch 41 and by coupling the terminal of capacitor 51 shown coupled to switch 41 to the sixth position of switch 45. Other modifications in the switching devices and arrangements are also possible. The particular switch arrangement was selected to facilitate the explanation of the illustrated embodiment.

The remaining video test patterns (horizontal and vertical lines, dots and crosshatch) are produced utilizing a vertical signal component derived from the output of oscillator 15 (189.648 kHz.) and a horizontal signal component derived from the output kHz.) counter 29 (658.5 Hz.). This arrangement is capable of producing, at the receiver under test, 10 visible vertical patterns of light and dark (two others occur during horizontal retrace) and 10 visible horizontal patterns of light and dark (one other occurs during vertical retrace). The selection and combination of appropriate pulses from the 189.648 kHz. and 658.5 Hz. pulse trains to provide the desired video waveforms are accomplished by means of a processing stage 55 and associated wave shaping components.

Processing stage 55 comprises a vertical line signal amplifier 57 and a horizontal line signal amplifier 59. A particular output of amplifiers 57 and 59 is selected by means of switch 47.

In each of switch positions 2—5, the substantially square wave output of amplifier 17 is coupled to keying stage 21. Since switches 41 and 43 are not in their sixth position, offset subcarrier oscillator 49 is inoperative and furthermore is disconnected from stage 21 at this time. Stage 21 serves to amplify the 189.648 kHz. square wave and apply it via switch 43 to a differentiating and clipping circuit 63. Circuit 63 supplies to amplifier 57 the desired train of relatively narrow (e.g. 0.2 microseconds) pulses for producing the vertical component of the desired line, crosshatch, or dot pattern. Variable resistance 65 serves to adjust the time duration of the pulses and hence to adjust the width of the vertical component of the desired video signal. This signal component is supplied to amplifier 57 in each of switch positions 2—5.

In the "HORIZONTAL LINES" position (switch position 2), the output of amplifier 57 is grounded via switch 45 and the 658.5 Hz. pulse train produced by counter 29 is coupled to amplifier 59 and then via a variable resistance brightness control 61, switch 47, and the modulation control resistance 35 to modulator diode 37. The desired pattern of 10 horizontal white lines is therefore produced on the receiver under test. Note that, as mentioned above, horizontal line and vertical field synchronizing pulses are at all times also applied to diode 37 and modulate the RF carrier wave produced by oscillator 39.

In the "VERTICAL LINE" position (switch position 3), the output of amplifier 59 is grounded via switch 45 while the output of amplifier 57 is coupled via control 61, switch 47, and control 35 to diode 37. The input to amplifier 57 as described above comprises a series of relatively narrow pulses at a repetition rate of 189.648 kHz. and results in a pattern of 10 visible vertical white lines on the receiver under test.

In the "CROSSHATCH" position (switch position 4) both amplifiers 57 and 59 provide outputs to modulator diode 37 (note there is no ground connection at position 4 of switch 45). The brightness control 61 serves as a differential brightness control in this and in the next ("DOTS") switch position.

In the "DOTS" position (switch position 5), an amplitude selective circuit 67 is coupled to the output of processing stage 55 for providing a video signal component only upon the simultaneous occurrence of the horizontal line (658.5 Hz.) and vertical line (189.648 kHz. pulses. The output of amplitude selective circuit 67 is applied via switch 47 and modulation control 35 to modulator diode 37 to produce the desired dot pattern on the receiver under test.

A fourth crystal controlled oscillator 69 arranged to produce a continuous wave carrier at 4.5 MHz, the intercarrier sound frequency for television, also may be provided so that fine tuning of a receiver under test may be accurately set by referring to "sound bars" in the video display as is well known. Oscillator 69 is provided with a switch 71 for disabling operation thereof when desired. The output of oscillator 69 is applied to the cathode electrode of modulator diode 37 as are the other components of the composite signal to be applied to a receiver under test.

In accordance with one aspect of the present invention, all of the signal components required for generation of the desired video test patterns, including field and line synchronizing signals but excluding the offset color subcarrier wave, are generated by means of a single, serially connected pulse divider chain 19. The pulse divider chain 19 is supplied with a stable reference input by oscillator 15. The pulse repetition rate of the line synchronizing signals is an integral multiple of (264 times) the rate of the field synchronizing signal such that nonstandard, noninterlaced scanning is utilized. As a result, the horizontal line, crosshatch and dot test patterns are produced utilizing sharper lines than is possible when interlaced scanning is utilized. That is, the minimum line height is one horizontal scanning line whereas, with interlaced scanning, the minimum height is two lines. This feature is particularly advantageous for convergence setup procedures in color television receivers.

Another important feature of the configuration described above relates to the fact that the pulse repetition rate of the video signal utilized for generating horizontal lines (658.5 Hz.) is an integral submultiple of the line scanning frequency (15,804 Hz.) employed in the generator. The "horizontal lines" video signal is generated in synchronism with the line scanning synchronizing pulses such that each horizontal line in the video pattern produced on a receiver under test begins and ends, respectively, at the beginning and end of the trace portion of a line scanning interval. Generators employing interlaced line scanning generally produce the "horizontal line" video signal in synchronism with the field or vertical deflection cycle. As a result, while horizontal line video signals generated during one field begin and end at the beginning and end of line scanning intervals, during the next field, the horizontal line video signals begin and end somewhere in the viewable area of the display screen. Broken lines may therefore be produced on the kinescope of the receiver under test. This undesirable disruption of the horizontal line video pattern is eliminated in the configuration described above.

What I claim is:

1. A signal generator for supplying test signals for television receivers comprising a first reference signal generator for producing a plurality of periodic waveforms, each of said waveforms being characterized by a frequency which is an integral multiple of the frequency of each lower frequency one of said plurality of waveforms and is an integral submultiple of the frequency of each higher frequency one of said plurality of waveforms, means for selecting and combining predetermined ones of said plurality of waveforms to produce a composite waveform including television line and field synchronizing components having integrally related frequencies wherein said line frequency is an integral multiple of said field frequency, and means coupled to said combining means for supplying said composite waveform to a television receiver under test.

2. A signal generator according to claim 1 wherein said plurality of waveforms are produced in synchronism with said first waveform and the frequencies of each of said plurality are integrally related to said first frequency.

3. A signal generator according to claim 2 and further comprising signal processing means for selectively combining said first and selected ones of said plurality of periodic waveforms to add video components to said composite waveform including television line and field synchronizing components.

4. A signal generator according to claim 3 wherein said means coupled to said first reference signal generator comprises means for producing a line synchronizing pulse waveform and means for producing a field synchronizing pulse waveform wherein the repetition rate of said field synchronizing pulses is an integral submultiple of the repetition rate of said line synchronizing pulses.

5. A signal generator according to claim 4 wherein said means coupled to said first reference signal generator further comprises means for producing a fourth pulse waveform characterized by a repetition rate intermediate and integrally related to said line and field synchronizing pulse repetition rates, and means for coupling said fourth pulse waveform to said signal processing means to provide a video pattern on a receiver under test characterized by a horizontal line pattern.

6. A signal generator according to claim 5 and further comprising amplitude selective means coupled to said signal processing means for producing from said first and fourth waveforms a video pattern of dots on a receiver under test.

7. A signal generator according to claim 3 and further comprising a second reference signal generator for producing a second periodic waveform at a second frequency equal to the difference between a standard broadcast color subcarrier reference frequency and the frequency of line synchronizing pulses included in said composite waveform, and keying means coupled to said first and second reference signal generators for producing a color bar video component for said composite waveform.

8. A signal generator for supplying test signals for television receivers comprising a first reference signal oscillator for producing a first periodic waveform at a first frequency, a single pulse divider chain coupled to said oscillator comprising a plurality of serially coupled integral pulse counters, signal combining means coupled to said pulse divider chain for providing television line and field synchronizing pulse waveforms having pulse repetition rates integrally related to each other and to said first frequency such that said line frequency is an integral multiple of said field frequency, and means selectively coupled to said oscillator and to said signal combining means for supplying to a television receiver under test a composite waveform including said line and field synchronizing pulse waveforms.

9. A signal generator according to claim 8 wherein said first frequency is an integral multiple of the pulse repetition rate of said line synchronizing pulse waveform and said pulse counters operate in time synchronism with said first oscillator.

10. A signal generator according to claim 9 wherein said pulse divider chain comprises a first counter for providing a waveform having a repetition rate equal to a desired line synchronizing pulse repetition rate, a second counter for providing a waveform having a repetition rate equal to a desired field synchronizing pulse repetition rate and a third counter for providing a waveform having a repetition rate intermediate but integrally related to both said line and field synchronizing pulse repetition rates.

11. A signal generator according to claim 10 and further comprising a signal processing amplifier selectively coupled to said first oscillator and said third counter for providing video components for said composite waveform.

12. A signal generator according to claim 9 and further comprising a second reference signal oscillator for producing an offset color subcarrier waveform at a frequency equal to the difference between a standard broadcast color subcarrier reference frequency and the repetition rate of line synchronizing pulses included in said composite waveform, and a color subcarrier keying stage coupled to said first and second oscillators for producing a color bar video component for said composite waveform.